United States Patent [19]

Schvester et al.

[11] Patent Number: 5,108,656
[45] Date of Patent: Apr. 28, 1992

[54] METHOD FOR PRESERVATION OF FRESH FISH OR SEA-FOOD

[75] Inventors: Pascal Schvester, Chicago; Richard Saunders, Downers Grove, both of Ill.

[73] Assignees: American Air Liquide, New York, N.Y.; Liquid Air Corporation, Walnut Creek, Calif.

[21] Appl. No.: 533,161

[22] Filed: Jun. 1, 1990

Related U.S. Application Data

[62] Division of Ser. No. 203,415, Jun. 7, 1988, Pat. No. 4,946,326.

[51] Int. Cl.$^5$ .............. A23B 4/08; A23B 4/09; A23B 4/16; B65B 31/00
[52] U.S. Cl. .................... 252/380; 426/320; 426/418; 426/129; 426/643; 426/235; 426/236; 426/544; 422/23; 423/262
[58] Field of Search .............. 252/380; 423/262; 422/23; 536/524; 426/320, 418, 129, 643, 235, 236, 544

[56] References Cited

U.S. PATENT DOCUMENTS

| | | | |
|---|---|---|---|
| 2,020,109 | 11/1935 | De Meric de Bellefon et al. | 426/418 |
| 3,096,181 | 7/1963 | Dixon et al. | 426/418 |
| 3,360,382 | 12/1967 | Miller | 426/418 |
| 3,563,770 | 2/1971 | Furia | 426/332 |
| 3,622,351 | 11/1971 | Cavallo | 426/332 |
| 3,715,860 | 2/1973 | Esty | 426/418 |
| 3,851,080 | 11/1974 | Lugg et al. | 426/312 |
| 3,930,040 | 12/1975 | Woodruff | 426/418 |
| 4,008,754 | 2/1977 | Kraushaar et al. | 426/418 |
| 4,054,672 | 10/1977 | Inoue et al. | 426/418 |
| 4,522,835 | 6/1985 | Woodruff et al. | 426/332 |

FOREIGN PATENT DOCUMENTS

| | | |
|---|---|---|
| 3203701 | 8/1983 | Fed. Rep. of Germany . |
| 2351008 | 1/1978 | France . |
| 2595583-A | 9/1987 | France . |
| 55-111755 | 8/1980 | Japan . |
| 58-209975 | of 1983 | Japan . |
| 58-047429 | 3/1983 | Japan . |
| 60-192542-A | 10/1985 | Japan . |

OTHER PUBLICATIONS

J. of Bacteriology, Feb. 1966, p. 622, "Growth Responses of *Neurospora crassa* to Increase Partial Pressures of Noble Gases and Nitrogen", Buchheit et al.
Experimental Biology, vol. 27, No. 3, May/Jun., 1968, "General Biological Effects of the Helium-Xenon Series of Elements".
J. of Industrial & Eng. Chem., Nov. 1930, p. 1191.

*Primary Examiner*—Deborah L. Kyle
*Assistant Examiner*—Valerie Fee
*Attorney, Agent, or Firm*—Curtis, Morris & Safford

[57] ABSTRACT

A gas mixture for preserving fish and sea-food products, comprising carbon dioxide, oxygen and argon with partial pressures in the following range:

| | |
|---|---|
| $CO_2$ | 50%–68% |
| $O_2$ | 5%–20% |
| Ar | 27%–45% |

This mixture slows down enzymatic reactions and microbiological development at the surface and inside the fish or sea-food product.

4 Claims, No Drawings

METHOD FOR PRESERVATION OF FRESH FISH OR SEA-FOOD

This application is a division of application Ser. No. 07/203,415, filed June 7, 1988 now U.S. Pat. No. 4,946,326.

BACKGROUND OF THE INVENTION

The usual industrial practice of catching fish or harvesting sea-food produce is to bring them on board of the fishing boat where processing of the catch is operated or not. Most of the time, fishing boats remain at sea for 5 days or more: therefore, it becomes necessary to process the catch as soon as possible and prevent it from turning bad. This is especially true for the catch obtaining during the early days at sea. A common practice is to store the catch in a refrigerated space mixed with an equivalent amount of crushed ice. When brought back to the port, the catch is either sold as fresh or more likely processed in various ways such as canning, smoking or freezing.

As soon as the catch is taken out of its living environment (sea water), degradation processes start. Chemical and bacteriological reactions are the major sources of fresh fish and sea-food degradations. Bacterial contamination has many origins. Part of it comes from ambient air, but handling, cleaning and storing operations are the major responsible factors for contamination of the product. When living in its natural environment, edible parts of fish or sea-food have an extremely low level of contamination (e.g., below 10 germs/g). However, it is not unusual to observe that level rising to $10^4$ or more germs/g after the product has been through every processing step. The higher the initial level of contamination, the faster the deterioration of the product will be and ultimately, part of the caught stock has to be destroyed because of its total loss of market value.

For a long period of time, it has been suggested to extend the shelf-life of fresh sea-food and fish by packaging these products under modified atmosphere in order to limit the microbial development on. It, has been suggested to use enriched or even pure $CO_2$ atmospheres. It is known from U.S. Pat. Nos. 3,851,080 and 3,930,040 and French Patent 81/20784 to use a binary or ternary mixture of $N_2$ and $CO_2$, $O_2$ and $CO_2$ or $O_2$, $N_2$ and $CO_2$, with partial pressures in the range of 50% $N_2$ and 50% $CO_2$ or 30% $N_2$ and 70% $CO_2$ or 20% $O_2$ and 80% $CO_2$. These compositions are appropriate and efficient for the extension of the shelf life of these products. $CO_2$ has an inhibiting effect on a wide number of microbial germs and a good solubility within fats and moist products. Therefore, it has become a basic requirement in gas packaging techniques to use $CO_2$ with a partial pressure as high as possible inside of the container. However, for moist products such as sea-food and fish, partial pressures of $CO_2$ above 70% have the tendency to acidify the product. Some bleaching effect of the product due to elevated $CO_2$ partial pressures may as well be observed. On the other hand, it has been shown that $CO_2$ does not have an inhibition effect on the growth of strictly anaerobic germs such as Clostridium.

Fresh fish or sea-food can be naturally contaminated with spores of Clostridium botulinum. In strict anaerobic conditions, these spores are susceptible to germinate and produce a toxic protein which is excessively dangerous for mankind. Risk of development is particularly high when the storage temperature of the package exceeds 4° C. This temperature has always been a difficult parameter to control all along the distribution chain of the product, and it is absolutely necessary to prevent the development of this germ in case of an accidental temperature rise. Introducing oxygen inside of the container or package is a recognized and accepted method to avoid Clostridium developments, and therefore an $O_2$ partial pressure of at least 5% is usually recommended for the final formulation of the gas mix. Nitrogen is used as a complimentary gas providing space filling or dilution but it is not effective for controlling the microbial development.

Using the various gas combinations available today for sea-food or fish packaging extends its shelf-life from 2 days (air) to 8 days (gas). Exceptionally, products featuring a very low level of initial contamination and low fat content can have their shelf-life extended to 12-15 days. However, considering the length of the fishing campaign, the transportation time required for the distribution of the product and the storage time on distributor's shelves, a shelf-life of 15 days is a minimum requirement for an efficient marketing of any fresh sea-food or fish products.

SUMMARY OF THE INVENTION

According to the invention, there is provided a gas mixture comprising carbon dioxide having a partial pressure in the range of 50% to 68%, oxygen having a partial pressure in the range of 5% to 20% and argon having a partial pressure in the range of 27% to 45%. These gas mixtures extend the shelf life of sea-food products and fish from 15 to 21 days at a storage temperature of about 4° C., for a bacteriological contamination of said products which is not higher than $10^4$ germs/g.

These gas mixtures slow down the enzymatic reactions and/or the microbiological development inside and/or at the surface of said fish and sea food products.

A storage temperature of 4° C. means preferably that this temperature is from 4° C.+1° C. to 4° C.−3° C. i.e., about between 5° C. and 1° C. In case of salted products, this temperature may be less.

According to a preferred embodiment of the invention, the partial pressure ranges are respectively between 50% to 65% for $CO_2$, between 10% and 20% for oxygen and between 30% to 40% for argon (at about the same temperature and bacteriological contamination). According to another preferred embodiment of the invention, it has been unexpectedly found that a gas mixture comprising about 30% argon, 50% $CO_2$ and 20% $O_2$ (partial pressures) is able to extend the shelf life of said sea-food product or fish to a period longer that 21 days without reaching the tolerable level of contamination ($10^4$ germs/g of said product or fish).

DETAILED DESCRIPTION OF THE INVENTION

Other and further features of the invention will be clearly understood by referring to the following examples and tables which have been chosen for purpose of illustration, along in with the claims.

EXAMPLES 1 TO 3

Fish scallops and shrimps have been selected to perform the following comparative examples. They have been packaged in a gas impermeable container under about atmospheric pressure. A compensated vacuum technique a gas flushing technique, said container being further heat-sealed to avoid substantially any contamination from the external atmosphere surrounding said container. The packaged products were stored at a temperature of 4° C. under atmospheres respectively of air (example 1), 30% $N_2$, 50% $CO_2$ and 20% $O_2$ (example 2), both according to prior art, and 30% argon, 50% $CO_2$ and 20% $O_2$ (example 3), according to the invention. Results regarding the contamination type after 7, 14 and 21 days of storage are summarized in the following Table 1.

TABLE 2

| | Product | | | | | |
|---|---|---|---|---|---|---|
| | Scallops | | | Shrimps | | |
| storage | Air | 30% $N_2$ 20% $O_2$ 50% $CO_2$ | 30% Ar 20% $O_2$ 50% $CO_2$ | Air | 30% $N_2$ 20% $O_2$ 50% $CO_2$ | 30% Ar 20% $O_2$ 50% $CO_2$ |
| 0 days | 1.31 | 1.31 | 1.31 | 0.54 | 0.54 | 0.54 |
| 7 days | 5.45 | 3.9 | 4.4 | 4.2 | 0.8 | 0.6 |
| 14 days | 12.9 | 7.3 | 6.4 | 7.8 | 4.2 | 1.6 |
| 21 days | 14.6 | 13.0 | 7.5 | 13.3 | 12.0 | 4.9 |

TABLE 1

| | Contamination type | Staphylococcus | pseudomonas | total Mesophilic | total Anaerobic | Lactobacillus | total Germs/g of product |
|---|---|---|---|---|---|---|---|
| 0 | Air | 2.1 | 3.7 | 4.6 | 2.2 | 2.5 | |
| | 30% Ar, 50% $CO_2$, 20% $O_2$ | 2.1 | 3.7 | 4.6 | 2.2 | 2.5 | |
| | 30% $N_2$, 50% $CO_2$, 20% $O_2$ | 2.1 | 3.7 | 4.6 | 2.2 | 2.5 | |
| 7 days | Air | 1.9 | 5.9 | 7.1 | 3.0 | 2.9 | |
| | 30% Ar, 50% $CO_2$, 20% $O_2$ | 1.5 | 2.9 | 3.5 | 3.0 | 2.8 | |
| | 30% $N_2$, 50% $CO_2$, 20% $O_2$ | 1.4 | 2.9 | 3.0 | 3.5 | 2.0 | |
| 14 days | Air | 4 | 5.9 | 7.0 | 4.3 | 4.5 | $10^7$ |
| | 30% Ar, 50% $CO_2$, 20% $O_2$ | 2.2 | 3.0 | 3.7 | 2.8 | 2.5 | $7 \cdot 10^3$ |
| | 30% $N_2$, 50% $CO_2$, 20% $O_2$ | 1.7 | 3.9 | 4.3 | 3.8 | 3.3 | $3.6 \cdot 10^4$ |
| 21 days | Air | 3 | 5.7 | 6.8 | 6.4 | 6 | $10^7$ |
| | 30% Ar, 50% $CO_2$, 20% $O_2$ | 1.7 | 3.2 | 3.7 | 3.3 | 2.8 | $10^4$ |
| | 30% $N_2$, 50% $CO_2$, 20% $O_2$ | 2.5 | 3.9 | 5.0 | 3.9 | 3.7 | $10^5$ |

Results are expressed in decimal logarithmic values/g of product storage temperature: 4° C.

From these results, it can be seen that after 21 days of storage, the 30% Ar, 50% $CO_2$, 20% $O_2$ mixture has a total level of bacteriological contamination close to $10^4$ germs/g of product as compared to more than $10^5$ germs/g of product for the 30% $N_2$, 50% $CO_2$, 20% $O_2$ mixture. Bearing in mind that $10^5$ germs/g is, in various countries, the tolerable limit for the bacteriological contamination level of a fresh product, it can be seen from these results that the gas mixture (30% Ar, 50% $CO_2$, 20% $O_2$) is able to extend the shelf-life of sea-food for a period longer than 21 days without reaching the tolerable level of contamination.

EXAMPLES 4 TO 6

The chemical and enzymatical degradation of the products stored (as explained before) under air and modified atmospheres were examined as well. The amount of volatile nitrogen (Amino compounds produced from chemical and enzymatical degradation of proteins) was measured in every sample with the mean of the total volatile amino bases method (TVAB), for fresh scallops and shrimps. The results obtained are summarized in Table 2.

From the above table 2, it is obviously shown that the gas mixture according to the invention has considerably slowed the chemical and enzymatical degradations of fresh sea-food products.

The use of a mixture according to the invention furthermore provides an inhibition effect on the growth rate of some microorganisms, such as fungi like *Neurospora crassa*, as argon is known to have such an effect (see for example "General Biological Effects of the Helium—Xenon Series of Elements" H. R. SCHREINER. Federation Proceedings—Vol 27—No. 3—May-June 1968—or "Growth Response of *Neurospora Crassa* to Increased Partial Pressures of the Noble Gas and Nitrogen"—R. G. Bachheit, H. R. Schreiner, G. F. Doebler—Journal of Bacteriologics, February 1966—American Society for Microbiology).

We claim:

1. A gas mixture for fish and sea-food products preservation comprising, in partial pressure, about 50% to 68% carbon dioxide, 5% to 20% oxygen and 27% to 45% argon, said mixture slowing down enzymatic reactions at the surface and inside said fish and sea-food products.

2. A gas mixture for fish and sea-food products preservation comprising, in partial pressure, about 50% to 68% carbon dioxide, 5% to 20% oxygen and 27% to 45% argon, said mixture slowing down the microbiological development at the surface and inside said fish and sea-food products.

3. A gas mixture according to claim 1, wherein said mixture comprises about 50% to 65% carbon dioxide, 10% to 20% oxygen and 30% to 40% argon.

4. A gas mixture according to claim 1, wherein said mixture comprises about 50% $CO_2$, 20% $O_2$ and 30% argon.

* * * * *